M. FUOS.
Thrashing Machine.
No. 86,743.         Patented Feb. 9, 1869.
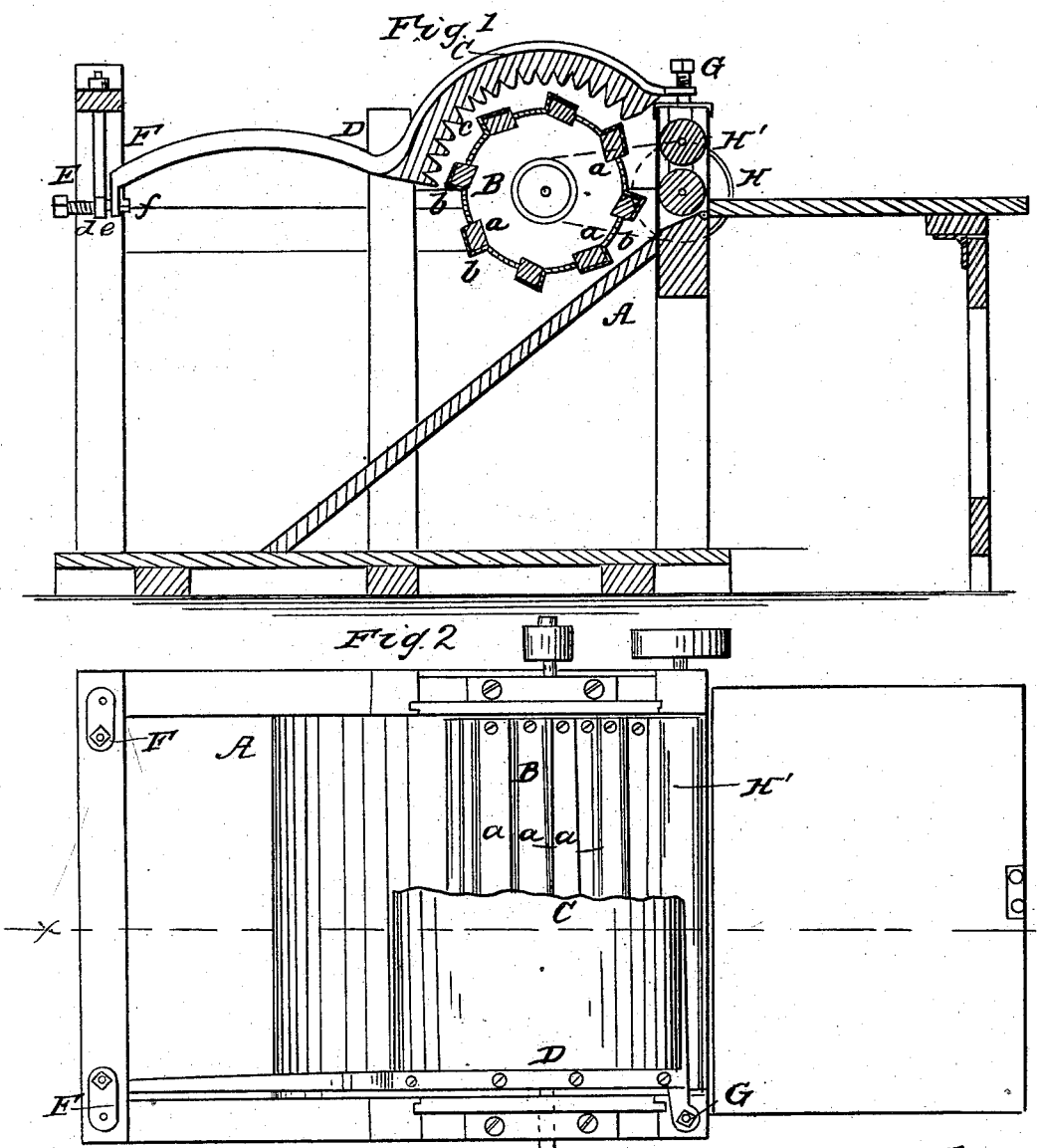

MATTHIAS FUOS, OF CASTROVILLE, TEXAS.

Letters Patent No. 86,743, dated February 9, 1869.

IMPROVEMENT IN THRESHING-MACHINE.

The Schedule referred to in these Letters Patent and making part of the same.

*To all whom it may concern:*

Be it known that I, MATTHIAS FUOS, of Castroville, in the county of Medina, and State of Texas, have invented a new and improved Threshing-Machine; and I do hereby declare that the following is a full, clear, and exact description thereof, which will enable those skilled in the art to make and use the same, reference being had to the accompanying drawings, forming part of this specification.

This invention relates to a new and improved machine for threshing grain; and

It consists in a novel construction of the same, as hereinafter fully shown and described, whereby grain may be threshed and separated from the straw in a very rapid and perfect manner, and without bruising or injuring the straw in any way.

In the accompanying sheet of drawings—

Figure 1 is a side sectional view of my invention, taken in the line $x\ x$, fig. 2.

Figure 2, a plan or top view of the same, partly in section.

Similar letters of reference indicate corresponding parts.

A represents a box, or case, which is of rectangular form, and has a cylinder, B, fitted in its upper part.

This is the threshing-cylinder, and it is composed of a series of longitudinal bars, $a$, placed at equal distances apart, on a smooth periphery, the outer surfaces of said bars having an oblique position, nearly in tangential lines with the periphery, as shown clearly in fig. 1.

The outer parts of these bars are covered with sheet-steel, $b$, and the periphery of the cylinder, between the bars $a$, may be covered with sheet-iron.

C is a concave cap, the inner surface of which is grooved or toothed, as shown at $c$, said grooves or teeth extending the whole width of the cap.

The cap should be of cast-iron, and it is placed directly over the cylinder B, and is supported in proper position by the following means:

To the upper surface of the cap, near each end of the same, there is attached a metal bar, D, and these bars extend backward a considerable distance to the rear of the cap, are bent downward at their ends, and have screws E passing through them.

These screws work in nuts $d$, at the lower ends of rods F, at the rear of the box, or case, and the screws have shoulders, $e$, on them, which bear against one side of the bars D, the nuts $f$ of the screws bearing against the opposite sides of the bars.

By this arrangement, it will be seen that the cap C may be adjusted more or less forward or backward, as desired.

The front ends of the bars D D have set-screws G G passing through them, which rest on the upper part of the front end of the box, and by adjusting these set-screws, the cap may be placed at a greater or less height above the cylinder.

By this arrangement, the inner grooved or toothed surface of the cap may be adjusted nearer to or further from the threshing-cylinder B, according to the kind of grain to be threshed.

H H' represent two feed-rollers, placed one above the other in the same axial plane.

The lower roller works in fixed bearings, but the upper roller has adjustable bearings.

These feed-rollers conduct the grain to the threshing-cylinder, the former being operated upon between the concave cap and the cylinder, so that the grain will be completely separated from the straw, and without injuring or bruising the latter in the least.

The feed-rollers present the grain to the machine very uniformly, crosswise between the cap and cylinder, the straw being discharged, thoroughly separated, one from the other.

I claim as new, and desire to secure by Letters Patent—

1. The cap C, secured to the curved longitudinal bars D, adjusted, with relation to the cylinder, by means of the set-screws G G, adjusting-screws E, and pendant-rods F, arranged in front and rear of said cylinder, as herein shown and described.

2. The feed-rollers H H', cylinder B, and concave C, when said concave is adjusted by means of the recess E G, suspending-rod F, and arm D, as herein shown and described.

MATTHIAS FUOS.

Witnesses:
RICHARD TURPE,
VALENTINE HAASS.